United States Patent [19]

King

[11] 4,247,156

[45] Jan. 27, 1981

[54] SHAFT BEARING

[75] Inventor: Anthony P. King, Sidcup, England

[73] Assignee: Mono Pumps Limited, Manchester, England

[21] Appl. No.: 19,555

[22] Filed: Mar. 12, 1979

[30] Foreign Application Priority Data

Mar. 14, 1978 [GB] United Kingdom ............... 10105/78

[51] Int. Cl.³ ......................... F16C 27/02; F16C 27/06
[52] U.S. Cl. ...................................... 308/26; 308/4 R; 308/78
[58] Field of Search ......................... 166/241; 175/325; 308/3 R, 4 A, 4 R, 22, 26, 28, 29, 72, 78, 121, 134.1, 139 R, 140, 146, 147, 237 R, 237 A, 238

[56] References Cited

U.S. PATENT DOCUMENTS

| 1,212,371 | 1/1917 | Leitch | 308/134.1 |
| 2,651,199 | 9/1953 | Collins et al. | 308/4 A X |
| 3,125,382 | 3/1964 | Herndon, Jr. et al. | 308/4 A |

FOREIGN PATENT DOCUMENTS 1031881 6/1966 United Kingdom.
1355268 6/1974 United Kingdom.

*Primary Examiner*—Frederick R. Schmidt
*Attorney, Agent, or Firm*—Lewis H. Eslinger

[57] ABSTRACT

A shaft bearing for locating a shaft within a tubular member, the bearing comprising a tubular central portion with an axial bore to receive the shaft. A plurality of arms extend outwardly from the tubular central portion in pairs, the arms all extending tangentially outwardly from the central portion, with the arms in each pair extending from opposite sides of, and generally parallel to, a plane which includes the axis of the tubular portion.

9 Claims, 1 Drawing Figure

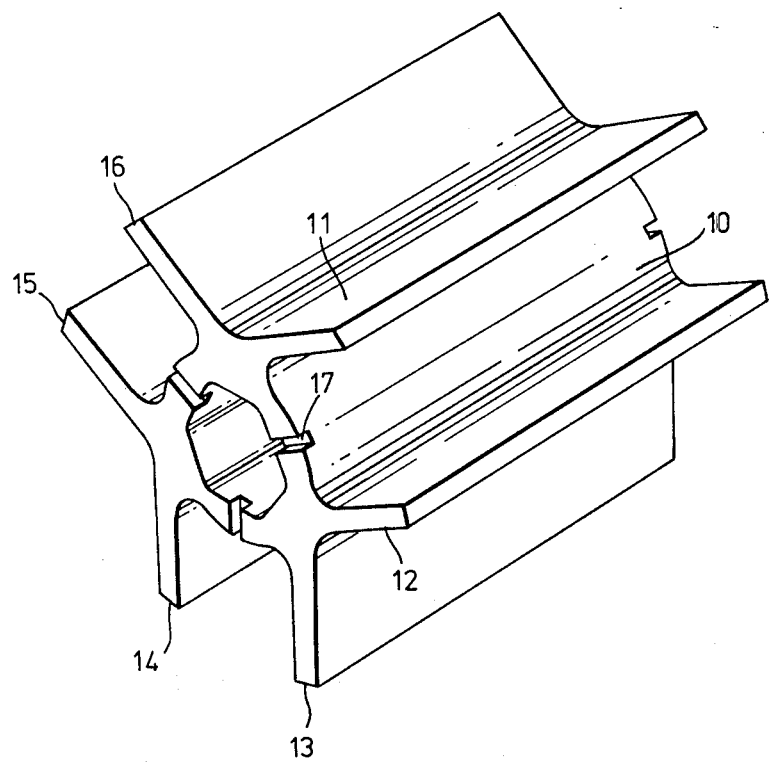

SHAFT BEARING

DESCRIPTION

This invention relates to a shaft bearing, for locating a shaft within a tubular member. The invention is particularly, though not exclusively, useful as a bearing for a shaft driving a borehole pump. Such shafts extend down the interior of a discharge pipe to transmit driving motion to a pump at the bottom of the pipe from a prime mover at the top. Bearings are required to keep the shaft generally central within the pipe, but as high precision in the positioning of the shaft is unnecessary, the bearings are to some degree resilient.

Shaft bearings of this type have been proposed including a central tubular portion which has an axial bore therein to receive the shaft and a plurality of arms extend outwardly from the tubular central portion to engage the walls of the tubular member. Such bearings are reasonably satisfactory, but they do not necessarily have a sufficient centering action and are sometimes difficult to introduce into the tubular member, such as a bore hole lining pipe.

It is now proposed, according to the present invention, to provide a shaft bearing for locating a shaft within a tubular member, the bearing comprising the tubular central portion with an axial bore to receive the shaft, and at least two pairs of arms extending tangentially outwardly from the central portion, the two arms in each pair extending from opposite sides of, and generally parallel to, a plane which includes the axis of the tubular portion, at least some of the arms being resilient.

Preferably all of the arms are resilient, and more preferably the bearing is an integral construction of resilient material, such as an elastomeric or a synthetic plastics material.

While at least two pairs of arms are mentioned, more can be provided and, it is believed, that three pairs equiangularly arranged, will be best.

A bearing according to the invention can be placed around a shaft, for instance between a pair of collars or other projections on the shaft, in order to keep it axially located, when the shaft is inserted in the pipe or other tubular member. The shaft is intended to rotate within the bearing, and each pair of tangentially disposed arms are so arranged as to prevent rotation of the bearing within the pipe. The resilient arms are an interference fit, preferably, in the pipe and the trailing arm, in the sense of rotation, engages firmly to lock the bearing in position and prevent it rotating in either direction. It does not matter, therefore, which way up the bearing is located, having regard to the direction of rotation of the shaft.

The sole FIGURE is a perspective view of a shaft bearing according to one embodiment of this invention.

With reference to the accompanying FIGURE, the following description will, by way of example, provide a clearer understanding of the present invention.

The bearing shown has a tubular central portion 10 with three pairs of parallel arms, 11, 12; 13, 14; and 15, 16 extending tangentially therefrom. The arms will normally extend over the full length of the central portion 10. The free edges of the arms are inclined to their width, so as generally to conform to the interior of the tubular member in which the bearings can be located. The portion 10 has an axial bore of polygonal cross section, to decrease the area of contact of the shaft therein and to improve lubrication, which is effected by the liquid being pumped. Further, as the bearing may be quite closely clamped between collars or other projections on the shaft to secure it in the axial direction, and in order to ensure a supply of such lubricant, radial passages 17 are provided through the wall of the central portion 10, preferably at the ends thereof. The bearing illustrated can be of elastomeric material, such as rubber or suitable synthetic plastics material.

I claim:

1. A shaft bearing for locating a shaft within a tubular member, said bearing comprising a tubular central portion defining an axial bore in said central portion to receive a shaft, and at least two pairs of arms extending tangentially outwardly from the central portion, the two arms in each pair extending generally in the same direction from the tubular central portion, and on opposite sides of, and generally parallel to, a plane which includes the axis of the tubular portion, at least some of the arms being resilient.

2. A shaft bearing as claimed in claim 1, wherein all the arms are resilient.

3. A shaft bearing as claimed in claim 2, which is an integral construction of resilient material.

4. A shaft bearing as claimed in claim 3, wherein the resilient material is rubber.

5. A shaft bearing as claimed in claim 3, wherein the resilient material is a synthetic plastics material.

6. A shaft bearing as claimed in claim 1, wherein there are three pairs of arms extending tangentially outwardly from the central portion, said pairs of arms being equiangularly arranged around said central portion.

7. A shaft bearing as claimed in claim 1, wherein said axial bore is polygonal in cross section.

8. A shaft bearing as claimed in claim 1, and further comprising means defining radial passages through the walls of the central portion.

9. A shaft bearing as claimed in claim 8, wherein said passages are located at the axial ends of said central portion.

* * * * *